(12) United States Patent
Zhou

(10) Patent No.: US 12,072,708 B2
(45) Date of Patent: Aug. 27, 2024

(54) DISTANCE MEASURING DEVICE AND SWEEPING ROBOT

(71) Applicant: SHENZHEN CAMSENSE TECHNOLOGIES CO., LTD, Guangdong (CN)

(72) Inventor: Kun Zhou, Guangdong (CN)

(73) Assignee: SHENZHEN CAMSENSE TECHNOLOGIES CO., LTD, Shenzhen (CN)

( * ) Notice: Subject to any disclaimer, the term of this patent is extended or adjusted under 35 U.S.C. 154(b) by 840 days.

(21) Appl. No.: 17/194,340

(22) Filed: Mar. 8, 2021

(65) Prior Publication Data

US 2021/0199421 A1 Jul. 1, 2021

Related U.S. Application Data

(63) Continuation of application No. PCT/CN2019/130008, filed on Dec. 30, 2019.

(30) Foreign Application Priority Data

Dec. 26, 2019 (CN) .......................... 201922395373.4

(51) Int. Cl.
*G05D 1/00* (2024.01)
*A47L 9/28* (2006.01)
*G01S 7/481* (2006.01)
*A47L 9/00* (2006.01)

(52) U.S. Cl.
CPC ................ *G05D 1/021* (2013.01); *A47L 9/28* (2013.01); *A47L 9/009* (2013.01); *A47L 2201/04* (2013.01); *G01S 7/4817* (2013.01)

(58) Field of Classification Search
CPC . G05D 1/021; A47L 9/28; A47L 9/009; A47L 2201/04; A47L 11/4061; G01S 7/4817; G01S 7/4813; G01S 17/88
See application file for complete search history.

(56) References Cited

U.S. PATENT DOCUMENTS

| 9,739,874 B2 | 8/2017 | Lee |
| 9,757,003 B1 | 9/2017 | Li et al. |
| 2017/0296023 A1 | 10/2017 | Qiao et al. |

(Continued)

FOREIGN PATENT DOCUMENTS

| CN | 202739924 U | 2/2013 |
| CN | 203317434 U | 12/2013 |
| CN | 203438228 U | 2/2014 |

(Continued)

*Primary Examiner* — David Redding

(57) ABSTRACT

The present disclosure provides a distance measuring device and a sweeping robot. The distance measuring device includes: a base, including a base plate and a side wall extending from the base plate; a baffle, arranged opposite to the base plate and covering part of the base plate; a first drive wheel and a second drive wheel, both rotatably mounted on the base; a connecting component; and a driving device. The side wall at least partially encloses an outer periphery of the first drive wheel, the baffle is attached to a part of the side wall enclosing the outer periphery of the first drive wheel, and the base plate, the baffle, and the side wall collaboratively enclose the first drive wheel, the second drive wheel, the base plate, the baffle and the side wall collaboratively define a mounting chamber, wherein the first drive wheel is received in the mounting chamber.

31 Claims, 5 Drawing Sheets

(56) References Cited

U.S. PATENT DOCUMENTS

2018/0003823 A1    1/2018  Yan

FOREIGN PATENT DOCUMENTS

| | | |
|---|---|---|
| CN | 104132639 A | 11/2014 |
| CN | 205514411 U | 8/2016 |
| CN | 105988120 A | 10/2016 |
| CN | 206076698 U | 4/2017 |
| CN | 108072869 A | 5/2018 |
| CN | 108443465 A | 8/2018 |
| CN | 109124493 A | 1/2019 |
| CN | 109849056 A | 6/2019 |
| CN | 209172024 U | 7/2019 |
| CN | 209269578 U | 8/2019 |
| CN | 209301025 U | 8/2019 |
| CN | 209611017 U | 11/2019 |
| CN | 209690505 U | 11/2019 |
| CN | 110588816 A | 12/2019 |
| CN | 209770263 U | 12/2019 |
| CN | 209770269 U | 12/2019 |
| EP | 3399337 A1 | 11/2018 |
| JP | 3178159 U | 9/2012 |
| WO | 2015165008 A1 | 11/2015 |
| WO | 2019093096 A1 | 5/2019 |

DISTANCE MEASURING DEVICE AND SWEEPING ROBOT

CROSS-REFERENCE TO RELATED APPLICATIONS

This application is a continuation of International Application No. PCT/CN2019/130008, with an international filing date of Dec. 30, 2019, which is based upon and claims priority to Chinese Patent Application No. 201922395373.4, filed with the Chinese Patent Office on Dec. 26, 2019, titled "DISTANCE MEASURING DEVICE", the entire contents of which are incorporated herein by reference.

TECHNICAL FIELD

Embodiments of the present disclosure relate to the technical field of robots, and in particular, relate to a distance measuring device and a sweeping robot.

BACKGROUND

Sweeping robots, also referred to as automatic cleaners, robotic vacuum cleaners, and the like, are a kind of smart household appliances. The sweeping robot, by virtue of artificial intelligence, automatically cleans the floor in the rooms. In order to enable the sweeping robot to perform highly-efficient and reasonable cleaning in an unknown environment, it is common practice in the field to configure a distance measuring device in the sweeping robot. Generally, the distance measuring device is a LiDAR, the sweeping robot, by this distance measuring device, is capable of achieving positioning and navigation thereof, and hence doing the cleaning according to a reasonable path.

The distance measuring device generally includes a base plate, a driving wheel and a driven wheel that are rotatably mounted on the base plate, a belt wound on the driving wheel and the driven wheel, a lens, a laser generator and the like ranging devices mounted on the driven wheel, and a driving device mounted on the base plate and configured to drive the driving wheel to rotate.

SUMMARY

Embodiments of the present disclosure provide a distance measuring device including:
  a base, including a base plate and a side wall extending from the base plate;
  a baffle, arranged opposite to the base plate and covering part of the base plate;
  a first drive wheel, rotatably mounted on the base;
  a second drive wheel, rotatably mounted on the base;
  a connecting component, wound on the first drive wheel and the second drive wheel, and configured to drive the second drive wheel to rotate when the first drive wheel rotates; and
  a driving device, connected to the first drive wheel, and configured to drive the first drive wheel to rotate;
  wherein the side wall at least partially encloses an outer periphery of the first drive wheel, the baffle is attached to a part of the side wall enclosing the outer periphery of the first drive wheel, and the base plate, the baffle, the side wall, and the second drive wheel collaboratively define a mounting chamber, wherein the first drive wheel is received in the mounting chamber.

As a further improvement of the above technical solution, the side wall encloses an outer periphery of the first drive wheel and the second drive wheel, one end of the side wall is connected to the base plate, the other end of the side wall extends towards the baffle, and the side wall and the base plate define a receiving slot, wherein the first drive wheel and the second drive wheel are both received in the receiving slot.

As a further improvement of the above technical solution, the distance measuring device further includes a mounting plate, wherein the mounting plate is fixed to one end, distal from the base plate, of the second drive wheel, and the mounting plate covers a gap between the second drive wheel and the baffle and a gap between the second drive wheel and the side wall.

As a further improvement of the above solution, along an orientation parallel to the orientation of the first drive wheel towards the second drive wheel, shapes of ends, proximal to the second drive wheel, of the baffle are adapted to a shape of the second drive wheel.

As a further improvement of the above technical solution, the distance measuring device further includes at least one limiting rib, wherein one end of the limiting rib is fixed to one of the base plate and the baffle, and the other end of the limiting rib is abutted against the other of the base plate and the baffle, such that the limiting rib supports the baffle.

As a further improvement of the above technical solution, the baffle is fixed to the base by snap-fitting; or
  the baffle is fixedly connected to the base by a threaded fastener.

As a further improvement of the above technical solution, the distance measuring device further includes a latch, wherein the latch includes a connecting portion and a latch portion;
  wherein one end of the connecting portion is connected to the baffle and the other end of the connecting portion extends towards the base plate, the latch portion is arranged at an end, distal from the baffle, of the connecting portion, and the latch portion passes through the base plate and is abutted against a surface, distal from the baffle, of the base plate.

As a further improvement of the above technical solution, the baffle is provided with at least one groove at an attachment position between the baffle and the side wall, and the side wall is provided with a bump adapted to the groove, wherein the bump is inserted into the groove; or
  the baffle is provided with at least one bump at an attachment position between the baffle and the side wall, and the side wall is provided with a groove adapted to the bump, wherein the bump is inserted into the groove.

As a further improvement of the above technical solution, the distance measuring device further includes a positioning rib, wherein the positioning rib is fixed to an end, proximal to the baffle, of the base plate, a positioning groove adapted to the positioning rib is arranged at a position, corresponding to the positioning rib, of the baffle, the positioning rib is inserted into the positioning groove, and the positioning rib cooperates with the side wall to prevent the baffle from moving in a plane parallel to the base plate.

As a further improvement of the above technical solution, the first drive wheel is a first pulley, the second drive wheel is a second pulley, and the connecting component is a belt, wherein the belt is wound on the first drive wheel and the second drive wheel; or
  the first drive wheel is a first sprocket, the second drive wheel is a second sprocket, and the connecting component is a chain, wherein the chain is wound on the first sprocket and the second sprocket.

Embodiments of the present disclosure also provide a distance measuring device including:

a base, including a base plate and a side wall extending from the base plate;

a baffle, arranged opposite to the base plate and covering part of the base plate;

a drive assembly, including a first drive wheel, wherein the first drive wheel is rotatably mounted on the base;

wherein the side wall at least partially encloses an outer periphery of the first drive wheel, the baffle is attached to a part of the side wall enclosing the outer periphery of the first drive wheel, and the base plate, the baffle, and the side wall collaboratively enclose the first drive wheel.

As a further improvement of the above technical solution, the drive assembly further includes:

a second drive wheel, rotatably mounted on the base;

a connecting component, wound on the first drive wheel and the second drive wheel, and configured to drive the second drive wheel to rotate when the first drive wheel rotates; and wherein the side wall at least partially encloses an outer periphery of the first drive wheel, the baffle is attached to a part of the side wall enclosing the outer periphery of the first drive wheel, along an orientation parallel to the orientation of the first drive wheel towards the second drive wheel, shapes of ends, proximal to the second drive wheel, of the baffle are adapted to a shape of the second drive wheel, and the base plate, the baffle, the side wall, and the second drive wheel collaboratively define a mounting chamber, wherein the first drive wheel is received in the mounting chamber.

As a further improvement of the above technical solution, the side wall encloses an outer periphery of the first drive wheel and the second drive wheel, one end of the side wall is connected to the base plate, the other end of the side wall extends towards the baffle, and the side wall and the base plate define a receiving slot, wherein the first drive wheel and the second drive wheel are both received in the receiving slot.

As a further improvement of the above technical solution, the distance measuring device further includes a mounting plate, wherein the mounting plate is fixed to one end, distal from the base plate, of the second drive wheel, and the mounting plate covers a gap between the second drive wheel and the baffle and a gap between the second drive wheel and the side wall.

As a further improvement of the above technical solution, along an orientation parallel to the orientation of the first drive wheel towards the second drive wheel, shapes of ends, proximal to the second drive wheel, of the baffle are adapted to a shape of the second drive wheel.

As a further improvement of the above technical solution, the distance measuring device further includes at least one limiting rib, wherein one end of the limiting rib is fixed to one of the base plate and the baffle, and the other end of the limiting rib is abutted against the other of the base plate and the baffle, such that the limiting rib supports the baffle.

As a further improvement of the above technical solution, the baffle is fixed to the base by snap-fitting; or the baffle is fixedly connected to the base by a threaded fastener.

As a further improvement of the above technical solution, the distance measuring device further includes a latch, wherein the latch includes a connecting portion and a latch portion;

wherein one end of the connecting portion is connected to the baffle and the other end of the connecting portion extends towards the base plate, the latch portion is arranged at an end, distal from the baffle, of the connecting portion, and the latch portion passes through the base plate and is abutted against a surface, distal from the baffle, of the base plate.

As a further improvement of the above technical solution, the baffle is provided with at least one groove at an attachment position between the baffle and the side wall, and the side wall is provided with a bump adapted to the groove, wherein the bump is inserted into the groove; or the side wall is provided with at least one bump at an attachment position between the baffle and the side wall, and the side wall is provided with a groove adapted to the bump, wherein the bump is inserted into the groove.

As a further improvement of the above technical solution, the distance measuring device further includes a positioning rib, wherein the positioning rib is fixed to an end, proximal to the baffle, of the base plate, a positioning groove adapted to the positioning rib is arranged at a position, corresponding to the positioning rib, of the baffle, the positioning rib is inserted into the positioning groove, and the positioning rib cooperates with the side wall to prevent the baffle from moving in a plane parallel to the base plate.

As a further improvement of the above technical solution, the first drive wheel is a first pulley, the second drive wheel is a second pulley, and the connecting component is a belt, wherein the belt is wound on the first pulley and the second pulley; or the first drive wheel is a first sprocket, the second drive wheel is a second sprocket, and the connecting component is a chain, wherein the chain is wound on the first sprocket and the second sprocket.

Embodiments of the present disclosure also provide a sweeping robot including the above distance measuring device.

BRIEF DESCRIPTION OF THE DRAWINGS

For clearer descriptions of the technical solutions according to the embodiments of the present disclosure, drawings that are to be referred for description of the embodiments are briefly described hereinafter. Apparently, the drawings described hereinafter merely illustrate some embodiments of the present disclosure. Persons of ordinary skill in the art may also derive other drawings based on the drawings described herein without any creative effort.

DETAILED DESCRIPTION

Figure 1:
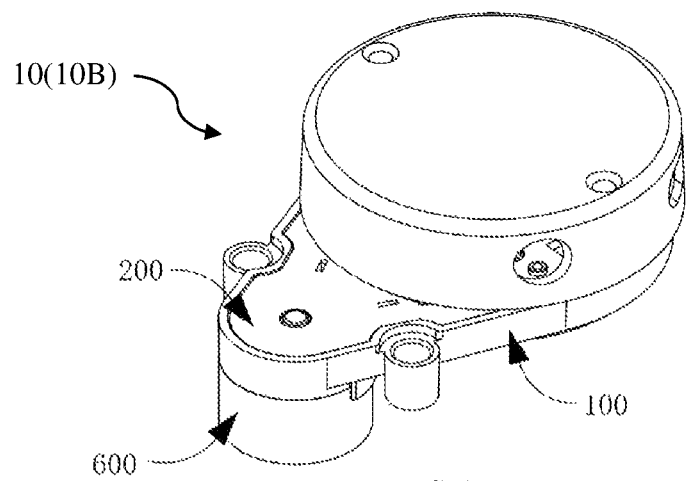
FIG. 1 is a schematic perspective view of a distance measuring device according to one embodiment of the present disclosure.

For better understanding of the present disclosure, the present disclosure is described in detail with reference to attached drawings and specific embodiments. It should be noted that, when an element is defined as "being secured or fixed to" another element, the element may be directly positioned on the element or one or more centered elements may be present therebetween. When an element is defined as "being connected to" another element, the element may be directly connected to the element or one or more centered elements may be present therebetween. As used herein, the terms "vertical," "horizontal," "left," "right," "inner," "outer," and similar expressions are only for illustration purposes.

Unless the context clearly requires otherwise, throughout the specification, technical and scientific terms used herein denote the meaning as commonly understood by a person skilled in the art. Additionally, the terms used in the specification of the present disclosure are merely for description the embodiments of the present disclosure, but are not intended to limit the present disclosure. As used herein, the term "and/or" includes any and all combinations of one or more related listed items.

In addition, technical features involved in various embodiments of the present disclosure described hereinafter may be combined as long as these technical features are not in conflict.

In the specification, the term "mount" includes fixing or retaining an element or device to a specific position or place by welding, threading, snapping, bonding or the like. The element or device may remain stationary in the specific position or place or may be movable within a specified range; and the element or device, after being fixed or retained to the specific position or place, may be detachable or not detachable, which are not limited in the embodiments of the present disclosure.

When the distance measuring device is mounted on the sweeping robot, the driving wheel is generally in an exposed state; when the sweeping robot suctions hair and the like foreign matters from the floor, the foreign matters are tended to be wound on the driving wheel under the effect of an internal wind pressure, such that the driving wheel and/or the driven wheel is locked. As a result, the distance measuring device fails to normally operate.

Embodiments of the present disclosure provide a distance measuring device, that may solve the technical problem that the distance measuring device fails to normally operate due to foreign matters entering a driving wheel of the distance measuring device. Referring to both FIG. 1 and FIG. 2, a schematic perspective view and an exploded view of a distance measuring device according to an embodiment of the present disclosure are respectively illustrated. The distance measuring device 10 includes a base 100, a baffle 200, a first drive wheel 300, a second drive wheel 400, a connecting component 500, and a driving device 600. Wherein the base 100 includes a base plate 110, and a side wall 120 extending from the base plate 110. The baffle 200 is arranged opposite to the base plate 110, and covers part of the base plate 110. The first drive wheel 300 and the second drive wheel 400 are both rotatably mounted on the base plate 110, and are both positioned at an end, proximal to the baffle 200, of the base plate 110. The connecting component 500 is wound on both the first drive wheel 300 and the second drive wheel 400, and is configured to drive the second drive wheel 400 to rotate when the first drive wheel 300 rotates. The driving device 600 is connected to the first drive wheel 300, and is configured to drive the first drive wheel 300 to rotate. The side wall 120 at least partially encloses an outer periphery of the first drive wheel 300, the baffle 200 is attached to a part of the side wall 120 enclosing the outer periphery of the first drive wheel 300, and the base plate 110, the baffle 200, the side wall 120, and the second drive wheel 400 collaboratively define a mounting chamber, wherein the first drive wheel 300 is received in the mounting chamber.

Figure 2:
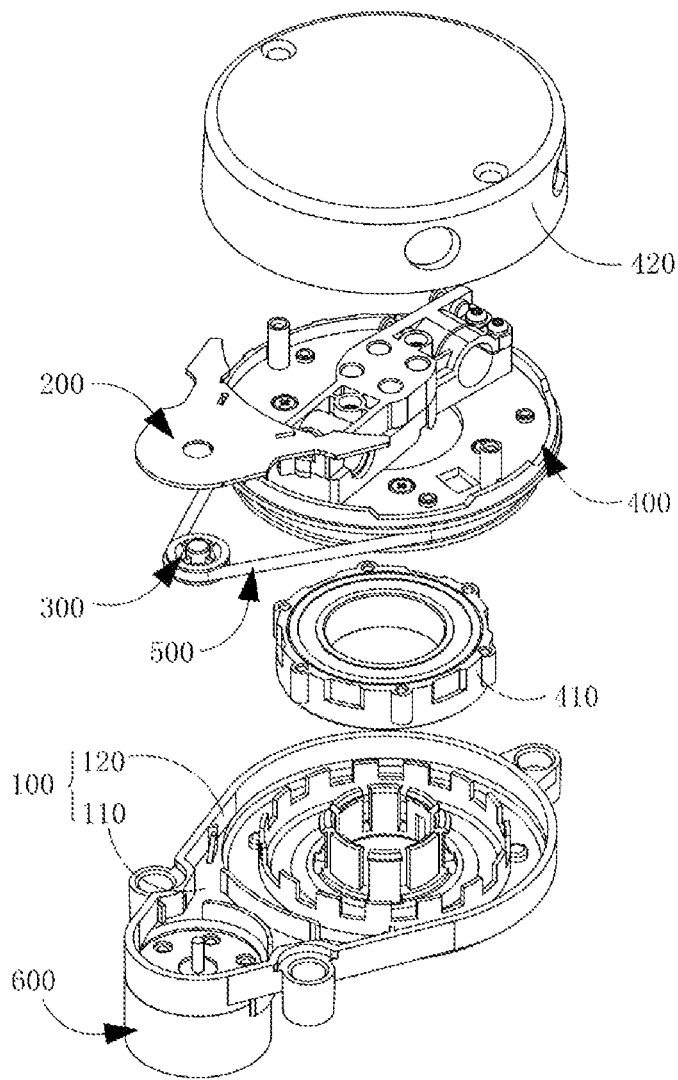
FIG. 2 is an exploded view of the distance measuring device in FIG. 1.
Figure 3:
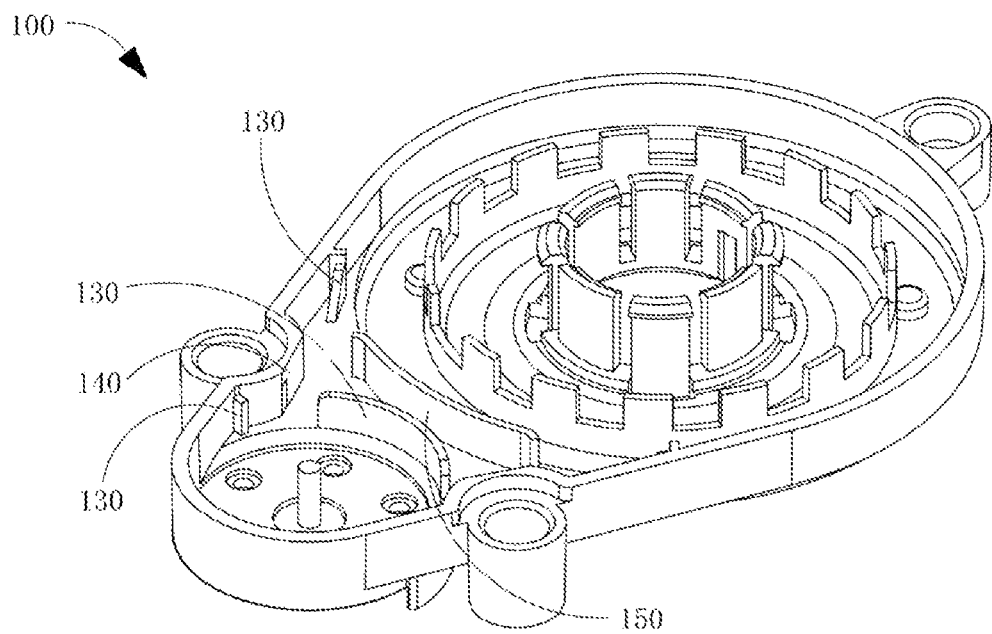
FIG. 3 is a schematic perspective view of a base in FIG. 2.

For the above base 100, referring to FIG. 3, a schematic perspective view of the base 100 is illustrated. Still referring to both FIG. 1 and FIG. 2, the base 100 includes the base plate 110 and the side wall 120. In this embodiment, one end of the side wall 120 is perpendicularly connected to an edge of the base plate 110, and the other end of the side wall 120 extends towards the baffle 200. The side wall 120 and the base plate 110 collaboratively define a receiving slot. The receiving slot is configured to receive the first drive wheel 300 and the second drive wheel 400. That is, the side wall 120 encloses an outer periphery of the first drive wheel 300 and the second drive wheel 400.

Figure 4:
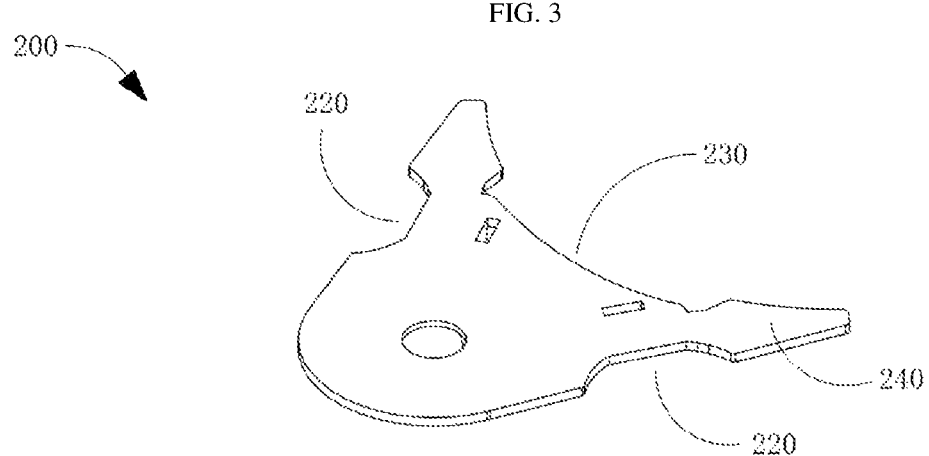
FIG. 4 is a schematic perspective view of a baffle in FIG. 2 in one direction.
Figure 5:
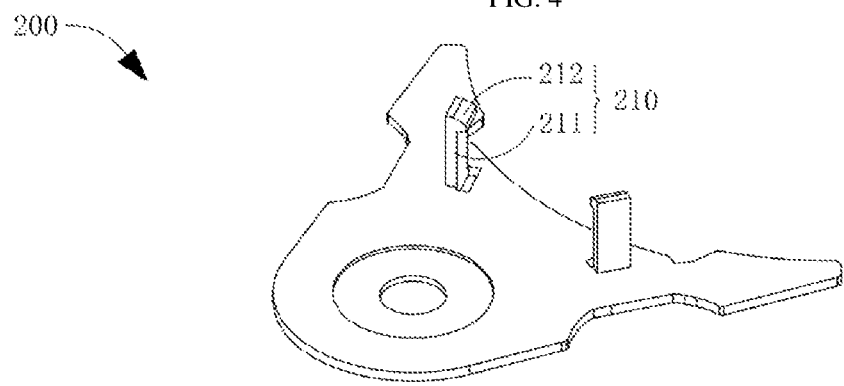
FIG. 5 is a schematic perspective view of the baffle in FIG. 2 in another direction.

For the above baffle 200, referring to both FIG. 4 and FIG. 5, schematic perspective views of the baffle 200 in two orientations are respectively illustrated. Still referring to both FIG. 1 to FIG. 3, the baffle 200 is entirely in a plate-shaped structure, and is arranged opposite to the base plate 110 and covers part of the base plate 110. The baffle 200 is entirely received in the receiving slot, and the baffle 200 and the part of the side wall 120 enclosing the outer periphery of the first drive wheel 300 are attached to each other. Along an orientation parallel to the orientation of the first drive wheel 300 towards the second drive wheel 400, one end of the baffle 200 covers the first drive wheel 300, and the other end of the baffle 200 extends towards the second drive wheel 400 to an edge of the second drive wheel 400. In addition, along the orientation parallel to the orientation of the first drive wheel 300 towards the second drive wheel 400, shapes of ends, proximal to the second drive wheel 400, of the baffle 200 are adapted to a shape of the second drive wheel 400. In this way, the base plate 110, the baffle 200, the side wall 120, and the second drive wheel 400 collaboratively define the mounting chamber. The first drive wheel 300 is received in the mounting chamber.

To prevent the baffle 200 from excessively extending into the receiving slot which causes interference between the baffle 200 and the first drive wheel 300, the base 100 further includes at least one limiting rib 130 arranged between the base plate 110 and the baffle 200. Specifically, referring to FIG. 3, one end of the limiting rib 130 is connected to the base plate 110, and the other end of the limiting rib 130 extends towards the baffle 200. Along an orientation of the base plate 110 towards the baffle 200, a distance between an end, distal from the base plate 110, of the limiting rib 130 and the base plate 110 is greater than a distance between an end, distal from the base plate 110, of the first drive wheel 300 and the base plate 110. The baffle 200 is carried on the at least one limiting rib 130, and is fixedly connected to the base plate 110. The end, distal from the base plate 110, of the limiting rib 130 is abutted against the baffle 200, such that the limiting rib 130 securely and reliably supports the baffle 200. It may be understood that in other embodiments of the present disclosure, one end of the limiting rib may be connected to the baffle, and the other end of the limiting rib may extend towards the base plate and may be abutted against the base plate to support the baffle. That is, one end of the limiting rib is fixed to one of the base plate and the baffle, and the other end of the limiting rib is abutted against the other of the base plate and the baffle.

In this embodiment, the baffle 200 is fixed to the base plate 110 of the base 100 by snap-fitting. Specifically, an end, proximal to the base plate 110, of the baffle 200 is provided with a latch 210. The latch 210 includes a connecting portion 211 and a latch portion 212. One end of the connecting portion 211 is connected to the baffle 200, and the other end of the connecting portion 211 extends towards the base plate 110. The latch portion 212 is arranged at an end, distal from the baffle 200, of the connecting portion 211. A through slot is arranged at a position of the base plate 110 corresponding to the latch 210. The latch portion 212 passes through the through slot, and is abutted against a surface, distal from the baffle 200, of the base plate 110, such that the baffle 200 and the base plate 110 are fixedly connected. It may be understood that in other embodiments of the present disclosure, the latch may also be arranged on the base plate 110, and correspondingly, a through slot is arranged at a position of the baffle 200 corresponding to the latch. The latch portion of the latch passes through the through slot on the baffle, and is abutted against a surface, distal from the base plate 110, of the baffle 200. It should be understood that in other embodiments of the present disclosure, the baffle 200 and the base plate 100 may also be fixedly connected in other fashions, for example, thread connection, which is not limited herein.

Further, for ease of positioning and mounting of the baffle 200, the baffle 200 is provided with at least one groove 220 at an attachment position between the baffle 200 and the side wall 120, and correspondingly, the side wall 120 is provided with a bump 140 adapted to the groove 220. The bump 140 is inserted into the groove 220. Engagement of the bump 140 and the groove 220, in one aspect, facilitates positioning and mounting of the baffle 200, and in another aspect, prevents the baffle 200 from sliding in a plane parallel to the base plate 110. It may be understood that in other embodiments of the present disclosure, the groove may also be arranged on the side wall 120, and correspondingly, the bump is arranged on the baffle. The baffle 200 and the base 100 are positioned and mounted by the groove and the bump, and are limited in the plane parallel to the base plate 110.

To further prevent the baffle 200 from sliding in the plane parallel to the base plate 110 when carried on the limiting ribs 130, the distance measuring device 10 further includes a positioning rib 150. One end of the positioning rib 150 is fixed to the end, proximal to the baffle 200, of the base plate 110, and the other end of the positioning rib 150 extends towards the baffle 200. A positioning groove 230 adapted to the positioning rib 150 is arranged at a position corresponding to the positioning rib 150 on the baffle 200. The positioning rib 150 is inserted into the positioning groove 230. The positioning rib 150 and the side wall 120 cooperates with each other to prevent the baffle 200 from moving in the plane parallel to the base plate 110. In this embodiment, the positioning rib 150 extends like a stripe on the plane of the base plate 110, and is arranged between the first drive wheel 300 and the second drive wheel 400 and spaces the first drive wheel 300 apart from the second drive wheel 400. A gap is defined between each of both ends of the positioning rib 150 and the side wall 120. The connecting component 500 may pass through the gap and may be hence entirely wound on the first drive wheel 300 and the second drive wheel 400. The positioning groove 230 corresponds to the positioning rib 150, and extends to pass through the baffle 200 along the orientation of the first drive wheel 300 towards the second drive wheel 400. With the positioning groove 230, two wing portions 240 are defined at an end, proximal to the second drive wheel 400, of the baffle 200. The positioning rib 150 is inserted into the positioning groove 230, and is abutted against to a wall portion, distal from the second drive wheel 400, of the positioning groove 230. Hence, the positioning rib 150 cooperates with the part enclosing at the outer periphery of the first drive wheel 300 to constrain the baffle 200 between profiles enclosed thereby. In this way, the baffle 200 is prevented from moving in the plane parallel to the base plate 110.

For the above the first drive wheel 300, the second drive wheel 400 and the connecting component 500, referring to FIG. 2, the first drive wheel 300 and the second drive wheel 400 are both rotatably mounted on the base 100; and the connecting component 500 is entirely in a closed stripe-shaped structure, is wound on both the first drive wheel 300 and the second drive wheel 400, and is capable of driving the second drive wheel 400 to rotate when the first drive wheel 300 rotates. The first drive wheel 300, the second drive wheel 400, and the connecting component 500 are all received in the receiving slot. That is, the first drive wheel 300, the second drive wheel 400, and the connecting component 500 are all positioned at an end, proximal to the baffle 200, of the base plate 110. In this embodiment, the first drive wheel 300 is a pulley, and is indirectly rotatably mounted on the base 100 by an output end of the driving device 600 fixed to the base 100; the second drive wheel 400 is a second pulley, and is rotatably mounted on the base 100 by a bearing 410, and a lens, a laser generator, a circuit board, and the like ranging device, and a shroud 420 covering these ranging devices are mounted at an end, distal from the base plate 110, of the second drive wheel 400; and the connecting component 500 is a belt. It should be noted that a distance between an end surface, distal from the base plate 110, of the second drive wheel 400 and the base plate 110 is greater than a distance between an end, distal from the base plate 110, of the first drive wheel 300 and the base plate 110, such that the second drive wheel 400, the base plate 110, the side wall 120, and the baffle 200 collaboratively define the mounting chamber. It may be understood that even if the first drive wheel 300 and the second drive wheel 400 in this embodiment are pulleys, the connecting component 500 is a belt, such configuration is not limited in the present disclosure. For example, in some other embodiments of the present disclosure, the first drive wheel 300 may also be a first sprocket, and correspondingly, the second drive wheel 400 is a second sprocket, and the connecting component 500 is a chain. The chain is wound on the first sprocket and the second sprocket.

Figure 6:
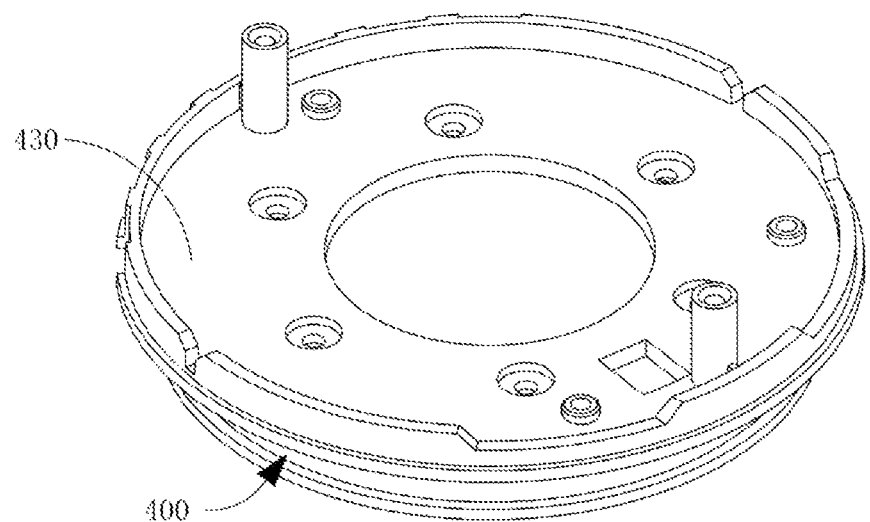
FIG. 6 is a schematic perspective view of a second drive wheel in FIG. 2 in one direction.
Figure 7:
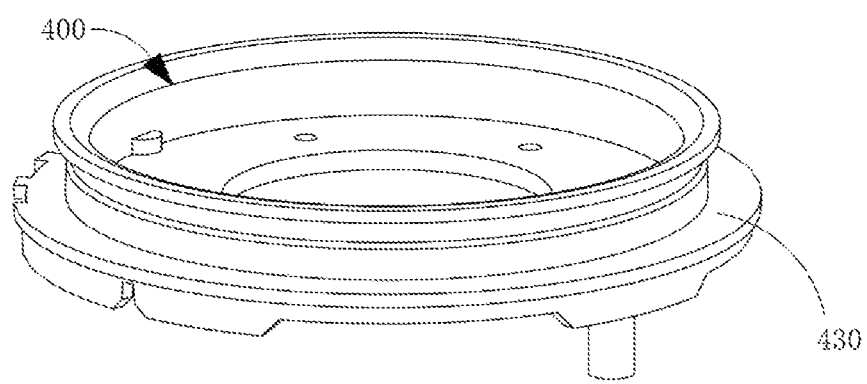
FIG. 7 is a schematic perspective view of the second drive wheel in FIG. 2 in another orientation.

Further, referring to FIG. 6 and FIG. 7, the distance measuring device 10 further includes a mounting plate 430 to prevent external foreign matters from entering the receiving slot from the gap between the second drive wheel 400 and the baffle 200 and the gap between the second drive wheel 400 and the side wall 120 to be hence wound on at least one of the first drive wheel 300, the second drive wheel 400, and the connecting component 500, such that the first drive wheel 300 and/or the second drive wheel 400 is locked. An end, distal from the base plate 110, of the second drive wheel 400, extends out of the receiving slot. The mounting plate 430 is entirely in a flat cylindrical plate-shaped structure, and is fixed to an end, distal from the base plate 110, of the second drive wheel 400, and entirely covers the gap between the second drive wheel 400 and the baffle 200 and the gap between the second drive wheel 400 and the side wall 120. The mounting plate 430, the baffle 200, the side wall 120, and the base plate 110 collaboratively define a drive space entirely enclosing the first drive wheel 300, the second drive wheel 400, and the connecting component 500. In this case, it is hard for the foreign matters to enter the drive space. The ranging devices and the shroud 420 are all mounted at an end, distal from the base plate 110, of the mounting plate 430.

For the above the driving device 600, still referring to FIG. 2, an output end of the driving device 600 is connected to the first drive wheel 300, and the driving device 600 is configured to drive the first drive wheel 300 to rotate. In this embodiment, the driving device 600 is a motor. A main body of the motor is fixed to a surface, distal from the baffle 200, of the base plate 110, the output end of the motor passes through the base plate 110 and extends into the mounting chamber and is connected to the first drive wheel 300. That is, the first drive wheel 300 is indirectly rotatably mounted on the base 100 by the driving device 600. It may be understood that in other embodiments of the present disclosure, the first drive wheel 300 may also be directly rotatably mounted on the base 100. It should be understood that the driving device 600 may also be any mechanism capable of implementing rotation output, to drive the first drive wheel 300 to rotate, for example, a cylinder, which is not exemplified herein.

The distance measuring device 10 according to the embodiments of the present disclosure includes the base 100, the baffle 200, the first drive wheel 300, the second drive wheel 400, the connecting component 500, and the driving device 600. Wherein the base 100 includes the base plate 110. The base plate 110 is arranged opposite to the baffle 200, and the baffle 200 covers part of the base plate 110. The first drive wheel 300 and the second drive wheel 400 are both rotatably mounted on a side, proximal to the baffle 200, of the base plate 110, and the connecting component 500 is wound on the first drive wheel 300 and the second drive wheel 400. The driving device 600 is connected to the first drive wheel 300, and is configured to drive the first drive wheel 300 to rotate. That is, the first drive wheel 300 is a driving wheel. The base 100 further includes a side wall 120, the side wall 120 at least partially encloses an outer periphery of the first drive wheel 300, the baffle 200 is attached to a part of the side wall 120 enclosing the outer periphery of the first drive wheel 300, and the base plate 110, the baffle 200, and the side wall 120 collaboratively enclose the first drive wheel 300, and the base plate 110, the baffle 200, the side wall 120, and the second drive wheel 400 collaboratively define a mounting chamber which entirely encloses the first drive wheel 300. In addition, it is hard for the external foreign matters to enter the mounting chamber and be wound on the first drive wheel. In this way, the technical problem that the driving wheel locked by the foreign matters wound thereon is addressed.

In addition, a mounting plate 430 is arranged at an end, distal from the base plate 110, of the second drive wheel 400. The mounting plate 430, the baffle 200, the side wall 120, and the base plate 110 collaboratively define a drive space entirely enclosing the first drive wheel 300, the second drive wheel 400, and the connecting component 500. In this case, it is hard for the foreign matters to enter the drive space. Therefore, the risks that the drive wheel is locked due to the foreign matters wound on the second drive wheel 400 and the connecting component 500 are avoided.

It should be understood that even if in this embodiment, the side wall 120 and the base plate 110 are integrally arranged, the present disclosure is not limited to such configuration. In other embodiments of the present disclosure, the side wall 120 may also be integrally arranged with the baffle 200, and the side wall 120 extends from the baffle 200 to the base plate 110. In this case, the base 100 still includes the base plate 110, and the side wall 120 extending from the base plate 110 to the baffle 200.

Figure 8:
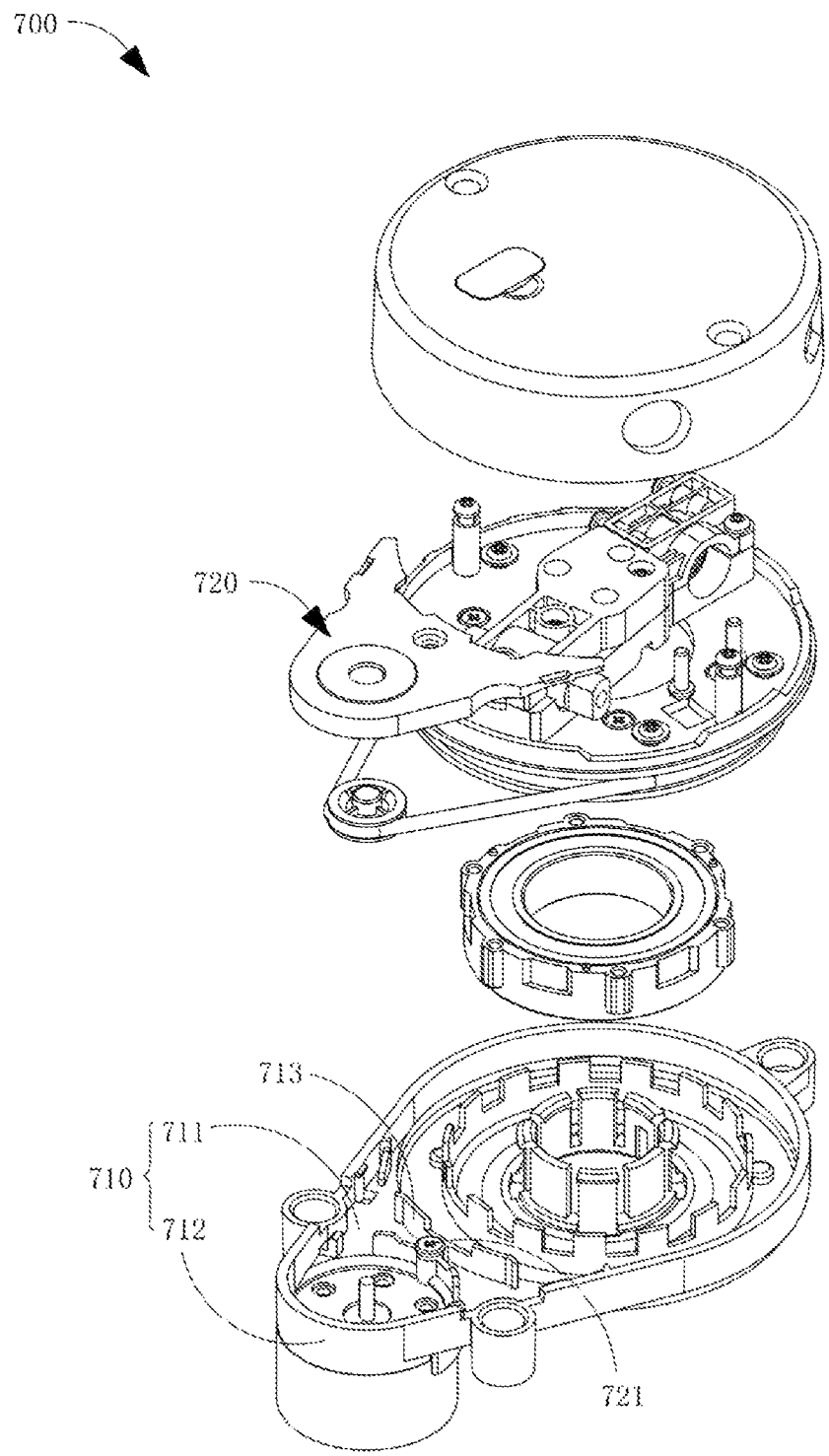
FIG. 8 is a schematic perspective view of a distance measuring device according to another embodiment of the present disclosure.

Referring to FIG. 8, a distance measuring device 700 according to another embodiment of the present disclosure is illustrated. Still referring to FIG. 1 to FIG. 7, the distance measuring device 700 is mainly different from the distance measuring device according to the first embodiment as follows:

The baffle 200 in the distance measuring device according to the first embodiment is provided with the groove 220, the side wall 120 is correspondingly provided with the bump 140 adapted to the groove 220, positioning is achieved between the baffle 200 and the base 100 by the groove 220 and the bump 140, and the baffle 200 is fixed to the base 100 by snap-fitting.

However, the distance measuring device 700 according to a second embodiment includes a base 710 and a baffle 720. The baffle 720 is not provided with the groove. The base 710 is not correspondingly provided with the bump. The baffle 720 achieves positioning in a plane parallel to the base plate 711 by cooperation between a positioning rib 713 and a side wall 712 enclosing an outer periphery of the first drive wheel 300. In addition, the baffle 720 and the base 710 are fixedly connected to each other by a threaded fastener 721. Specifically, a limiting rib is provided with a thread hole, a through hole is arranged at a position of the baffle 720 corresponding to the thread hole, the threaded fastener 721 passes through the through hole and extends into the thread hole, and is hence connected to the base plate 711, such that the baffle 720 is fixed to the base 710.

Since the second drive wheel is rotatably mounted on the base 710 by a bearing, in an assembly process, the second drive wheel is generally mounted before the baffle 720 is mounted. In this case, during mounting of the baffle 720, two swing portions of the baffle 720 is first obliquely inserted beneath a mounting plate, and then is rotated to be horizontally carried on the limiting ribs. In this process, configuration of the groove and the bump according to the first embodiment may tend to cause interference between the baffle and the base, which increases the difficulty of mounting and dismounting of the baffle. Therefore, during mounting of the baffle 720 according to the second embodiment, the two swing portions only need to be obliquely inserted beneath the mounting plate, and then the baffle 720 is rotated such that the positioning groove cooperates with the positioning rib. In the meantime, a side portion of the baffle 720 is attached to a part of the side wall 712 enclosing the outer periphery of the first drive wheel, and the baffle 720 is made to be carried on the limiting ribs. Accordingly, the distance measuring device according to the second embodiment more facilitates mounting and dismounting of the baffle 720, and helps to improve the efficiency and experience of an operator during mounting the baffle 720. Meanwhile, the threaded fastener 721 achieves a better fastening effect over the snap-fitting connection.

Based on the same inventive concept, an embodiment of the present disclosure further provides another distance measuring device. The distance measuring device 10B has a similarity to the distance measuring device 10 according to the first embodiment. Therefore, the specific structure of the distance measuring device 10B is still described hereinafter with reference to FIG. 1 to FIG. 7.

First, referring to both FIG. 1 and FIG. 2, the distance measuring device 10B includes a base 100, a baffle 200, a drive assembly (not illustrated in the drawings), and a ranging device configured to measure distances. Wherein, the base 100 includes a base plate 100, and a side wall 120 extending from the base plate 110. The baffle 200 is arranged opposite to the base plate 110, and covers part of the base plate 110. The drive assembly includes the first drive wheel 300. The first drive wheel 300 is rotatably mounted on the base plate 110, and is arranged at an end, proximal to the baffle 200, of the base plate 110. The first drive wheel 300 is rotatable relative to the base plate under driving by an external driving device. The side wall 120 at least partially encloses an outer periphery of the first drive wheel 300, the baffle 200 is attached to a part of the side wall 120 enclosing the outer periphery of the first drive wheel 300, and the base plate 110, the baffle 200, and the side wall 120 collaboratively enclose the first drive wheel 300. The ranging device (not illustrated in the drawings) is mounted on the drive assembly, and is rotatable by 360 degrees in a plane parallel to the base plate 110 under driving by the drive assembly, thereby implementing a ranging task.

For the above base 100, referring to FIG. 3, a schematic perspective view of the base 100 is illustrated. Still referring to both FIG. 1 and FIG. 2, the base 100 includes the base plate 110 and the side wall 120. In this embodiment, one end of the side wall 120 is perpendicularly connected to an edge of the base plate 110, and the other end of the side wall 120 extends towards the baffle 200. The side wall 120 and the base plate 110 collaboratively define a receiving slot. The receiving slot is configured to receive the drive assembly. That is, the side wall 120 encloses an outer periphery of the drive assembly.

For the above baffle 200, referring to both FIG. 4 and FIG. 5, schematic perspective views of the baffle 200 in two orientations are respectively illustrated. Still referring to both FIG. 1 to FIG. 3, the baffle 200 is entirely in a plate-shaped structure, and is arranged opposite to the base plate 110 and covers part of the base plate 110. The baffle 200 is entirely received in the receiving slot, and the baffle 200 and the part of the side wall 120 enclosing the outer periphery of the first drive wheel 300 are attached to each other.

To prevent the baffle 200 from excessively extending into the receiving slot which causes interference between the baffle 200 and the first drive wheel 300, the base 100 further includes at least one limiting rib 130 arranged between the base plate 110 and the baffle 200. Specifically, referring to FIG. 3, one end of the limiting rib 130 is connected to the base plate 110, and the other end of the limiting rib 130 extends towards the baffle 200. Along an orientation of the base plate 110 towards the baffle 200, a distance between an end, distal from the base plate 110, of the limiting rib 130 and the base plate 110 is greater than a distance between an end, distal from the base plate 110, of the first drive wheel 300 and the base plate 110. The baffle 200 is carried on the at least one limiting rib 130, and is fixedly connected to the base plate 110. The end, distal from the base plate 110, of the limiting rib 130 is abutted against the baffle 200, such that the limiting rib 130 securely and reliably supports the baffle 200. It may be understood that in other embodiments of the present disclosure, one end of the limiting rib may be connected to the baffle, and the other end of the limiting rib may extend towards the base plate and may be abutted against the base plate to support the baffle. That is, one end of the limiting rib is fixed to one of the base plate and the baffle, and the other end of the limiting rib is abutted against the other of the base plate and the baffle.

In this embodiment, the baffle 200 is fixed to the base plate 110 of the base 100 by snap-fitting. Specifically, an end, proximal to the base plate 110, of the baffle 200 is provided with a latch 210. The latch 210 includes a connecting portion 211 and a latch portion 212. One end of the connecting portion 211 is connected to the baffle 200, and the other end of the connecting portion 211 extends towards the base plate 110. The latch portion 212 is arranged at an end, distal from the baffle 200, of the connecting portion 211. A through slot is arranged at a position of the base plate 110 corresponding to the latch 210. The latch portion 212 passes through the through slot, and is abutted against a surface, distal from the baffle 200, of the base plate 110, such that the baffle 200 and the base plate 110 are fixedly connected. It may be understood that in other embodiments of the present disclosure, the latch may also be arranged on the base plate 110, and correspondingly, a through slot is arranged at a position of the baffle 200 corresponding to the latch. The latch portion of the latch passes through the through slot on the baffle, and is abutted against the surface, distal from the base plate 110, of the baffle 200. It should be understood that in other embodiments of the present disclosure, the baffle 200 and the base plate 100 may also be fixedly connected in other fashions, for example, thread connection, which is not limited herein.

Further, for ease of positioning and mounting of the baffle 200, the baffle 200 is provided with at least one groove 220 at an attachment position between the baffle 200 and the side wall 120, and correspondingly, the side wall 120 is provided with a bump 140 adapted to the groove 220. The bump 140 is inserted into the groove 220. Engagement of the bump 140 and the groove 220, in one aspect, facilitates positioning and mounting of the baffle 200, and in another aspect, prevents the baffle 200 from sliding in a plane parallel to the base plate 110. It may be understood that in other embodiments of the present disclosure, the groove may also be arranged on the side wall 120, and correspondingly, the bump is arranged on the baffle. The baffle 200 and the base 100 are positioned and mounted by the groove and the bump, and are limited in the plane parallel to the base plate 110.

For the above drive assembly, referring to FIG. 2, the drive assembly includes the first drive wheel 300. The first drive wheel 300 is entirely enclosed by the base plate 110, the baffle 200, and the side wall 120. The ranging device is mounted on the first drive wheel 300, and is at least partially positioned on a side, distal from the base plate 110, of the baffle 200. In this embodiment, the ranging device includes a lens, a laser generator, a circuit board, or the like. The ranging device is capable of circumferentially rotating when the first drive wheel 300 rotates, to implement the ranging process of the distance measuring device 10B.

Further, considering that the first drive wheel 300 is directly connected to the external driving device, the first drive wheel 300 has a high rotation speed. As a result, the distance measuring process of the distance measuring device 10B is not stable. To overcome this defect, the drive assembly further includes the second drive wheel 400 and the connecting component 500. The second drive wheel 400 is rotatably mounted on the base 100, and is arranged on a side, proximal to the baffle 200, of the base plate. A radial dimension of the second drive wheel 400 is greater than a radial dimensional of the first drive wheel 300. The ranging device is mounted at an end, distal from the base plate 110, of the second drive wheel 400, and is sealed and protected by a shroud 420. Along an orientation parallel to the orientation of the first drive wheel 300 towards the second drive wheel 400, one end of the baffle 200 covers the first drive wheel 300, and the other end of the baffle 200 extends towards the second drive wheel to reach an edge of the second drive wheel 400. In addition, along an orientation parallel to the orientation of the first drive wheel 300 towards the second drive wheel 400, shapes of ends, proximal to the second drive wheel 400, of the baffle 200 are adapted to a shape of the second drive wheel 400. In this way, the base plate 110, the baffle 200, the side wall 120, and the second drive wheel 400 collaboratively define a mounting chamber. The first drive wheel 300 is received in the mounting chamber. The connecting component 500 is entirely in a closed stripe-shaped structure, and is wound on both the first drive wheel 300 and the second drive wheel 400, and is capable of driving the second drive wheel 400 to rotate when the first drive wheel 300 rotates. The second drive wheel 400 and the connecting component 500 are both received in the receiving slot. In this embodiment, the first drive wheel 300 is a first pulley; the second drive wheel 400 is a second pulley, and is rotatably connected to the base 100 by a bearing 410; and the connecting component 500 is a belt, and is in an annular closed shape and wound on the first pulley and the second pulley. It should be noted that a distance between an end surface, distal from the base plate 110, of the second drive wheel 400 and the base plate 110 is greater than a distance between an end, distal from the base plate 110, of the first drive wheel 300 and the base plate 110, such that the second drive wheel 400, the base plate 110, the side wall 120, and the baffle 200 collaboratively define the mounting chamber. It may be understood that even if the first drive wheel 300 and the second drive wheel 400 in this embodiment are pulleys, the connecting component 500 is a belt, such configuration is not limited in the present disclosure. For example, in some other embodiments of the present disclosure, the first drive wheel 300 may also be a first sprocket, and correspondingly, the second drive wheel 400 is a second sprocket, and the connecting component 500 is a chain. The chain is wound on the first sprocket and the second sprocket.

To further prevent the baffle 200 from sliding in the plane parallel to the base plate 110 when carried on the limiting ribs 130, the distance measuring device 10B further includes a positioning rib 150. One end of the positioning rib 150 is fixed to an end, proximal to the baffle 200, of the base plate 110, and the other end of the positioning rib 150 extends towards the baffle 200. A positioning groove 230 adapted to the positioning rib 150 is arranged at a position corresponding to the positioning rib 150 on the baffle 200. The positioning rib 150 is inserted into the positioning groove 230. The positioning rib 150 and the side wall 120 cooperates with each other to prevent the baffle 200 from moving in the plane parallel to the base plate 110. In this embodiment, the positioning rib 150 extends like a stripe on the plane of the base plate 110, and is arranged between the first drive wheel 300 and the second drive wheel 400 and spaces the first drive wheel 300 apart from the second drive wheel 400. A gap is defined between each of both ends of the positioning rib 150 and the side wall 120. A connecting component 500 may pass through the gap and may be hence entirely wound on the first drive wheel 300 and the second drive wheel 400. The positioning groove 230 corresponds to the positioning rib 150, and extends to pass through the baffle 200 along an orientation parallel to the orientation of the first drive wheel 300 towards the second drive wheel 400. With the positioning groove 230, two wing portions 240 are defined at an end, proximal to the second drive wheel 400, of the baffle 200. The positioning rib 150 is inserted into the positioning groove 230, and is abutted against to a wall portion, distal from the second drive wheel 400, of the positioning groove 230. Hence, the positioning rib 150 cooperates with the part enclosing at the outer periphery of the first drive wheel 300 to constrain the baffle 200 between profiles enclosed thereby. In this way, the baffle 200 is prevented from moving in the plane parallel to the base plate 110.

Further, referring to FIG. 6 and FIG. 7, the distance measuring device 10B further includes a mounting plate 430 to prevent external foreign matters from entering the receiving slot from the gap between the second drive wheel 400 and the baffle 200 and the gap between the second drive wheel 400 and the side wall 120 to be hence wound on at least one of the first drive wheel 300, the second drive wheel 400, and the connecting component 500, such that the first drive wheel 300 and/or the second drive wheel 400 is locked. An end, distal from the base plate 110, of the second drive wheel 400, extends out of the receiving slot. The mounting plate 430 is entirely in a flat cylindrical plate-shaped structure, and is fixed to an end, distal from the base plate 110, of the second drive wheel 400, and entirely covers the gap between the second drive wheel 400 and the baffle 200 and the gap between the second drive wheel 400 and the side wall 120. The mounting plate 430, the baffle 200, the side wall 120, and the base plate 110 collaboratively define a drive space entirely enclosing the first drive wheel 300, the second drive wheel 400, and the connecting component 500. In this case, it is hard for the foreign matters to enter the drive space. The ranging devices and the shroud 420 are all mounted at an end, distal from the base plate 110, of the mounting plate 430.

The distance measuring device 10B according to the embodiments of the present disclosure includes the base 100, the baffle 200, and the drive assembly. Wherein, the base 100 includes the base plate 110. The base plate 110 is arranged opposite to the baffle 200, and the baffle 200 covers part of the base plate 110. The drive assembly includes the first drive wheel 300 rotatably mounted on the base plate 110. The first drive wheel 300 is a driving wheel, and is capable of rotating under driving by an external driving device, and hence drives the ranging devices to rotate. The base 100 further includes the side wall 120. The side wall 120 at least partially encloses an outer periphery of the first drive wheel 300, the baffle 200 is attached to a part of the side wall 120 enclosing the outer periphery of the first drive wheel 300, and the base plate 110, the baffle 200, and the side wall 120 collaboratively enclose the first drive wheel 300. In addition, it is hard for the external foreign matters to enter the space defined by the base plate 110, the baffle 200, and the side wall 120 and be wound on the first drive wheel 300. In this way, the technical problem that the driving wheel locked by the foreign matters wound thereon is addressed.

It should be understood that even if in this embodiment, the side wall 120 and the base plate 110 are integrally arranged, the present disclosure is not limited to such configuration. In other embodiments of the present disclosure, the side wall 120 may also be integrally arranged with the baffle 200, and the side wall 120 extends from the baffle 200 to the base plate 110. In this case, the base 100 still includes the base plate 110, and the side wall 120 extending from the base plate 110 to the baffle 200.

In addition, some improvements may also be made to the baffle 200 on the basis of the distance measuring device 10B according to this embodiment, such that positioning between the baffle 200 and the side wall 120 is not practiced by a groove. Instead, the baffle 200 is positioned in the plane parallel to the base plate 110 by cooperation between the positioning rib on the base plate 110 and the side wall enclosing the outer periphery of the first drive wheel. Further, the baffle 200 and the base 100 are fixed by a threaded fastener. The specific improvements are similar to the distance measuring device 700 as illustrated in FIG. 8, which are not described herein any further.

Figure 9:
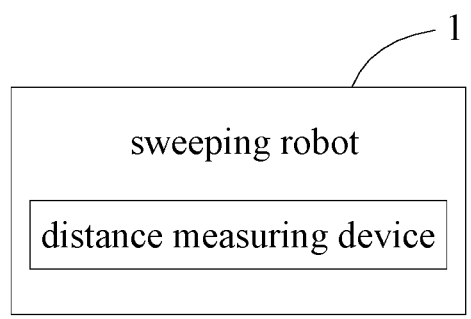
FIG. 9 is a schematic diagram of a sweeping robot according to one embodiment of the present disclosure.

Based on the same inventive concept, an embodiment of the present disclosure further provides a sweeping robot. Referring to FIG. 9, the sweeping robot 1 includes the distance measuring device according to any of the above embodiments, that is, the structure of the distance measuring device is the same as that of the distance measuring device 10, or the distance measuring device 70, or the distance measuring device 10B. Therefore, the sweeping robot is capable of effectively preventing the driving wheel of the distance measuring device from being locked due to the foreign matters wound thereon.

Finally, it should be noted that the above embodiments are merely used to illustrate the technical solutions of the present disclosure rather than limiting the technical solutions of the present disclosure. Under the concept of the present disclosure, the technical features of the above embodiments or other different embodiments may be combined, the steps therein may be performed in any sequence, and various variations may be derived in different aspects of the present disclosure, which are not detailed herein for brevity of description. Although the present disclosure is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present disclosure.

What is claimed is:

1. A distance measuring device, comprising:
 a base, comprising a base plate and a side wall extending from the base plate;
 a baffle, arranged opposite to the base plate and covering part of the base plate;
 a first drive wheel, rotatably mounted on the base;
 a second drive wheel, rotatably mounted on the base;
 a connecting component, wound on the first drive wheel and the second drive wheel, and configured to drive the second drive wheel to rotate when the first drive wheel rotates; and
 a driving device, connected to the first drive wheel, and configured to drive the first drive wheel to rotate;
 wherein the side wall at least partially encloses an outer periphery of the first drive wheel, the baffle is attached to a part of the side wall enclosing the outer periphery of the first drive wheel, and the base plate, the baffle, and the side wall collaboratively enclose the first drive wheel, the second drive wheel, the base plate, the baffle and the side wall collaboratively define a mounting chamber, wherein the first drive wheel is received in the mounting chamber;
 wherein the side wall encloses an outer periphery of the first drive wheel and the second drive wheel, one end of the side wall is connected to the base plate, the other end of the side wall extends towards the baffle, and the side wall and the base plate define a receiving slot, wherein the first drive wheel and the second drive wheel are both received in the receiving slot;
 wherein the distance measuring device further comprising a mounting plate, wherein the mounting plate is fixed to one end, distal from the base plate, of the second drive wheel, and the mounting plate covers a gap between the second drive wheel and the baffle and a gap between the second drive wheel and the side wall;
 the base plate and the side wall collaboratively enclose the second drive wheel, and the mounting plate, the baffle and the base collaboratively define a drive space enclosing the second drive wheel.

2. The distance measuring device according to claim 1, wherein along an orientation parallel to the orientation of the first drive wheel towards the second drive wheel, one end of the baffle covers the first drive wheel, and the other end of the baffle extends towards the second drive wheel to an edge of the second drive wheel, shapes of ends, proximal to the second drive wheel, of the baffle are adapted to a shape of the second drive wheel.

3. The distance measuring device according to claim 1, further comprising at least one limiting rib, wherein one end of the limiting rib is fixed to one of the base plate and the baffle, and the other end of the limiting rib is abutted against the other of the base plate and the baffle, such that the limiting rib supports the baffle.

4. The distance device according to claim 3, wherein the baffle is fixed to the base by snap-fitting; or
 the baffle is fixedly connected to the base by a threaded fastener.

5. The distance measuring device according to claim 1, wherein
 the baffle is provided with at least one groove at an attachment position between the baffle and the side wall, and the side wall is provided with a bump adapted to the groove, wherein the bump is inserted into the groove; or
 the baffle is provided with at least one bump at an attachment position between the baffle and the side wall, and the side wall is provided with a groove adapted to the bump, wherein the bump is inserted into the groove.

6. The distance measuring device according to claim 1, further comprising a positioning rib, wherein the positioning rib is fixed to an end, proximal to the baffle, of the base plate, a positioning groove adapted to the positioning rib is arranged at a position, corresponding to the positioning rib, of the baffle, the positioning rib is inserted into the positioning groove, and the positioning rib cooperates with the side wall to prevent the baffle from moving in a plane parallel to the base plate.

7. A distance measuring device, comprising:
 a base, comprising a base plate and a side wall extending from the base plate;
 a baffle, arranged opposite to the base plate and covering part of the base plate; and
 a drive assembly, including a first drive wheel, wherein the first drive wheel is rotatably mounted on the base;
 wherein the side wall at least partially encloses an outer periphery of the first drive wheel, the baffle is attached to a part of the side wall enclosing the outer periphery of the first drive wheel, and the base plate, the baffle, and the side wall collaboratively enclose the first drive wheel;
 wherein the drive assembly further comprises:
 a second drive wheel, rotatably mounted on the base; and a connecting component, wound on the first drive wheel and the second drive wheel, and configured to drive the second drive wheel to rotate when the first drive wheel rotates; and wherein along an orientation parallel to the orientation of the first drive wheel towards the second drive wheel, shapes of ends, proximal to the second drive wheel, of the baffle are adapted to a shape of the second drive wheel, and the second drive wheel, the base plate, the baffle and the side wall collaboratively define a mounting chamber enclosing the first drive wheel;

wherein the side wall encloses an outer periphery of the first drive wheel and the second drive wheel, one end of the side wall is connected to the base plate, the other end of the side wall extends towards the baffle, and the side wall and the base plate define a receiving slot, wherein the first drive wheel and the second drive wheel are both received in the receiving slot;

wherein the distance measuring device further comprising a mounting plate, wherein the mounting plate is fixed to one end, distal from the base plate, of the second drive wheel, and the mounting plate covers a gap between the second drive wheel and the baffle and a gap between the second drive wheel and the side wall;

the base plate and the side wall collaboratively enclose the second drive wheel, and the mounting plate, the baffle and the base collaboratively define a drive space enclosing the second drive wheel.

8. The distance measuring device according to claim 7, further comprising at least one limiting rib, wherein one end of the limiting rib is fixed to one of the base plate and the baffle, and the other end of the limiting rib is abutted against the other of the base plate and the baffle, such that the limiting rib supports the baffle.

9. The distance measuring device according to claim 7, wherein the baffle is provided with at least one groove at an attachment position between the baffle and the side wall, and the side wall is provided with a bump adapted to the groove, wherein the bump is inserted into the groove; or the baffle is provided with at least one bump at an attachment position between the baffle and the side wall, and the side wall is provided with a groove adapted to the bump, wherein the bump is inserted into the groove.

10. The distance measuring device according to claim 7, further comprising a positioning rib, wherein the positioning rib is fixed to an end, proximal to the baffle, of the base plate, a positioning groove adapted to the positioning rib is arranged at a position, corresponding to the positioning rib, of the baffle, the positioning rib is inserted into the positioning groove, and the positioning rib cooperates with the side wall to prevent the baffle from moving in a plane parallel to the base plate.

11. A sweeping robot, comprising a distance measuring device, wherein the distance measuring device comprises:
a base, comprising a base plate and a side wall extending from the base plate;
a baffle, arranged opposite to the base plate and covering part of the base plate;
a first drive wheel, rotatably mounted on the base;
a second drive wheel, rotatably mounted on the base;
a connecting component, wound on the first drive wheel and the second drive wheel, and configured to drive the second drive wheel to rotate when the first drive wheel rotates; and
a driving device, connected to the first drive wheel, and configured to drive the first drive wheel to rotate;

wherein the side wall at least partially encloses an outer periphery of the first drive wheel, the baffle is attached to a part of the side wall enclosing the outer periphery of the first drive wheel, and the base plate, the baffle, and the side wall collaboratively enclose the first drive wheel, the second drive wheel, the base plate, the baffle and the side wall collaboratively define a mounting chamber, wherein the first drive wheel is received in the mounting chamber;

wherein the side wall encloses an outer periphery of the first drive wheel and the second drive wheel, one end of the side wall is connected to the base plate, the other end of the side wall extends towards the baffle, and the side wall and the base plate define a receiving slot, wherein the first drive wheel and the second drive wheel are both received in the receiving slot;

wherein the distance measuring device further comprises a mounting plate, wherein the mounting plate is fixed to one end, distal from the base plate, of the second drive wheel, and the mounting plate covers a gap between the second drive wheel and the baffle and a gap between the second drive wheel and the side wall;

the base plate and the side wall collaboratively enclose the second drive wheel, and the mounting plate, the baffle and the base collaboratively define a drive space enclosing the second drive wheel.

12. The sweeping robot according to claim 11, wherein the baffle is entirely in a plate-shaped structure, a shape of the baffle is adapted to a shape of the part of the side wall enclosing the outer periphery of the first drive wheel;

along an orientation parallel to the orientation of the first drive wheel towards the second drive wheel, one end of the baffle covers the first drive wheel, and the other end of the baffle extends towards the second drive wheel to an edge of the second drive wheel, shapes of ends, proximal to the second drive wheel, of the baffle are adapted to a shape of the second drive wheel, and a gap exists between the baffle and the second drive wheel.

13. A distance measuring device, comprising:
a base, comprising a base plate and a side wall extending from the base plate;
a baffle, arranged opposite to the base plate and covering part of the base plate;
a first drive wheel, rotatably mounted on the base;
a second drive wheel, rotatably mounted on the base;
a connecting component, wound on the first drive wheel and the second drive wheel, and configured to drive the second drive wheel to rotate when the first drive wheel rotates; and
a driving device, connected to the first drive wheel, and configured to drive the first drive wheel to rotate;

wherein the side wall at least partially encloses an outer periphery of the first drive wheel, the baffle is attached to a part of the side wall enclosing the outer periphery of the first drive wheel, and the base plate, the baffle, and the side wall collaboratively enclose the first drive wheel, the second drive wheel, the base plate, the baffle and the side wall collaboratively define a mounting chamber, wherein the first drive wheel is received in the mounting chamber;

the distance measuring device, further comprising at least one limiting rib, wherein one end of the limiting rib is fixed to one of the base plate and the baffle, and the other end of the limiting rib is abutted against the other of the base plate and the baffle, such that the limiting rib supports the baffle.

14. The distance measuring device according to claim 13, wherein
the baffle is provided with at least one groove at an attachment position between the baffle and the side wall, and the side wall is provided with a bump adapted to the groove, wherein the bump is inserted into the groove; or
the baffle is provided with at least one bump at an attachment position between the baffle and the side wall, and the side wall is provided with a groove adapted to the bump, wherein the bump is inserted into the groove.

15. The distance measuring device according to claim 13, further comprising a positioning rib, wherein the positioning rib is fixed to an end, proximal to the baffle, of the base plate, a positioning groove adapted to the positioning rib is arranged at a position, corresponding to the positioning rib, of the baffle, the positioning rib is inserted into the positioning groove, and the positioning rib cooperates with the side wall to prevent the baffle from moving in a plane parallel to the base plate.

16. A distance measuring device, comprising:
a base, comprising a base plate and a side wall extending from the base plate;
a baffle, arranged opposite to the base plate and covering part of the base plate;
a first drive wheel, rotatably mounted on the base;
a second drive wheel, rotatably mounted on the base;
a connecting component, wound on the first drive wheel and the second drive wheel, and configured to drive the second drive wheel to rotate when the first drive wheel rotates; and
a driving device, connected to the first drive wheel, and configured to drive the first drive wheel to rotate;
wherein the side wall at least partially encloses an outer periphery of the first drive wheel, the baffle is attached to a part of the side wall enclosing the outer periphery of the first drive wheel, and the base plate, the baffle, and the side wall collaboratively enclose the first drive wheel, the second drive wheel, the base plate, the baffle and the side wall collaboratively define a mounting chamber, wherein the first drive wheel is received in the mounting chamber;
wherein the baffle is provided with at least one groove at an attachment position between the baffle and the side wall, and the side wall is provided with a bump adapted to the groove, wherein the bump is inserted into the groove; or
the baffle is provided with at least one bump at an attachment position between the baffle and the side wall, and the side wall is provided with a groove adapted to the bump, wherein the bump is inserted into the groove.

17. The distance measuring device according to claim 16, further comprising a positioning rib, wherein the positioning rib is fixed to an end, proximal to the baffle, of the base plate, a positioning groove adapted to the positioning rib is arranged at a position, corresponding to the positioning rib, of the baffle, the positioning rib is inserted into the positioning groove, and the positioning rib cooperates with the side wall to prevent the baffle from moving in a plane parallel to the base plate.

18. A distance measuring device, comprising:
a base, comprising a base plate and a side wall extending from the base plate;
a baffle, arranged opposite to the base plate and covering part of the base plate;
a first drive wheel, rotatably mounted on the base;
a second drive wheel, rotatably mounted on the base;
a connecting component, wound on the first drive wheel and the second drive wheel, and configured to drive the second drive wheel to rotate when the first drive wheel rotates; and
a driving device, connected to the first drive wheel, and configured to drive the first drive wheel to rotate;
wherein the side wall at least partially encloses an outer periphery of the first drive wheel, the baffle is attached to a part of the side wall enclosing the outer periphery of the first drive wheel, and the base plate, the baffle, and the side wall collaboratively enclose the first drive wheel, the second drive wheel, the base plate, the baffle and the side wall collaboratively define a mounting chamber, wherein the first drive wheel is received in the mounting chamber;
the distance measuring device, further comprising a positioning rib, wherein the positioning rib is fixed to an end, proximal to the baffle, of the base plate, a positioning groove adapted to the positioning rib is arranged at a position, corresponding to the positioning rib, of the baffle, the positioning rib is inserted into the positioning groove, and the positioning rib cooperates with the side wall to prevent the baffle from moving in a plane parallel to the base plate.

19. A distance measuring device, comprising:
a base, comprising a base plate and a side wall extending from the base plate;
a baffle, arranged opposite to the base plate and covering part of the base plate; and
a drive assembly, including a first drive wheel, wherein the first drive wheel is rotatably mounted on the base;
wherein the side wall at least partially encloses an outer periphery of the first drive wheel, the baffle is attached to a part of the side wall enclosing the outer periphery of the first drive wheel, and the base plate, the baffle, and the side wall collaboratively enclose the first drive wheel;
wherein the drive assembly further comprises:
a second drive wheel, rotatably mounted on the base; and
a connecting component, wound on the first drive wheel and the second drive wheel, and configured to drive the second drive wheel to rotate when the first drive wheel rotates; and
wherein along an orientation parallel to the orientation of the first drive wheel towards the second drive wheel, shapes of ends, proximal to the second drive wheel, of the baffle are adapted to a shape of the second drive wheel, and the second drive wheel, the base plate, the baffle and the side wall collaboratively define a mounting chamber enclosing the first drive wheel;
the distance measuring device, further comprising at least one limiting rib, wherein one end of the limiting rib is fixed to one of the base plate and the baffle, and the other end of the limiting rib is abutted against the other of the base plate and the baffle, such that the limiting rib supports the baffle.

20. The distance measuring device according to claim 19, wherein the baffle is provided with at least one groove at an attachment position between the baffle and the side wall, and the side wall is provided with a bump adapted to the groove, wherein the bump is inserted into the groove; or
the baffle is provided with at least one bump at an attachment position between the baffle and the side wall, and the side wall is provided with a groove adapted to the bump, wherein the bump is inserted into the groove.

21. The distance measuring device according to claim 19, further comprising a positioning rib, wherein the positioning rib is fixed to an end, proximal to the baffle, of the base plate, a positioning groove adapted to the positioning rib is arranged at a position, corresponding to the positioning rib, of the baffle, the positioning rib is inserted into the positioning groove, and the positioning rib cooperates with the side wall to prevent the baffle from moving in a plane parallel to the base plate.

22. A distance measuring device, comprising:
a base, comprising a base plate and a side wall extending from the base plate;
a baffle, arranged opposite to the base plate and covering part of the base plate; and
a drive assembly, including a first drive wheel, wherein the first drive wheel is rotatably mounted on the base;
wherein the side wall at least partially encloses an outer periphery of the first drive wheel, the baffle is attached to a part of the side wall enclosing the outer periphery of the first drive wheel, and the base plate, the baffle, and the side wall collaboratively enclose the first drive wheel;
wherein the baffle is provided with at least one groove at an attachment position between the baffle and the side wall, and the side wall is provided with a bump adapted to the groove, wherein the bump is inserted into the groove; or
the baffle is provided with at least one bump at an attachment position between the baffle and the side wall, and the side wall is provided with a groove adapted to the bump, wherein the bump is inserted into the groove.

23. The distance measuring device according to claim 22, wherein the drive assembly further comprises:
a second drive wheel, rotatably mounted on the base; and
a connecting component, wound on the first drive wheel and the second drive wheel, and configured to drive the second drive wheel to rotate when the first drive wheel rotates; and
wherein along an orientation parallel to the orientation of the first drive wheel towards the second drive wheel, shapes of ends, proximal to the second drive wheel, of the baffle are adapted to a shape of the second drive wheel, and the second drive wheel, the base plate, the baffle and the side wall collaboratively define a mounting chamber enclosing the first drive wheel.

24. The distance measuring device according to claim 22, wherein the side wall encloses an outer periphery of the first drive wheel and the second drive wheel, one end of the side wall is connected to the base plate, the other end of the side wall extends towards the baffle, and the side wall and the base plate define a receiving slot, wherein the first drive wheel and the second drive wheel are both received in the receiving slot;
the distance measuring device, further comprising a mounting plate, wherein the mounting plate is fixed to one end, distal from the base plate, of the second drive wheel, and the mounting plate covers a gap between the second drive wheel and the baffle and a gap between the second drive wheel and the side wall;
the base plate and the side wall collaboratively enclose the second drive wheel, and the mounting plate, the baffle and the base collaboratively define a drive space enclosing the second drive wheel.

25. The distance measuring device according to claim 22, further comprising at least one limiting rib, wherein one end of the limiting rib is fixed to one of the base plate and the baffle, and the other end of the limiting rib is abutted against the other of the base plate and the baffle, such that the limiting rib supports the baffle.

26. The distance measuring device according to claim 22, further comprising a positioning rib, wherein the positioning rib is fixed to an end, proximal to the baffle, of the base plate, a positioning groove adapted to the positioning rib is arranged at a position, corresponding to the positioning rib, of the baffle, the positioning rib is inserted into the positioning groove, and the positioning rib cooperates with the side wall to prevent the baffle from moving in a plane parallel to the base plate.

27. A distance measuring device, comprising:
a base, comprising a base plate and a side wall extending from the base plate;
a baffle, arranged opposite to the base plate and covering part of the base plate; and
a drive assembly, including a first drive wheel, wherein the first drive wheel is rotatably mounted on the base;
wherein the side wall at least partially encloses an outer periphery of the first drive wheel, the baffle is attached to a part of the side wall enclosing the outer periphery of the first drive wheel, and the base plate, the baffle, and the side wall collaboratively enclose the first drive wheel;
the distance measuring device, further comprising a positioning rib, wherein the positioning rib is fixed to an end, proximal to the baffle, of the base plate, a positioning groove adapted to the positioning rib is arranged at a position, corresponding to the positioning rib, of the baffle, the positioning rib is inserted into the positioning groove, and the positioning rib cooperates with the side wall to prevent the baffle from moving in a plane parallel to the base plate.

28. The distance measuring device according to claim 27, wherein the drive assembly further comprises:
a second drive wheel, rotatably mounted on the base; and
a connecting component, wound on the first drive wheel and the second drive wheel, and configured to drive the second drive wheel to rotate when the first drive wheel rotates; and
wherein along an orientation parallel to the orientation of the first drive wheel towards the second drive wheel, shapes of ends, proximal to the second drive wheel, of the baffle are adapted to a shape of the second drive wheel, and the second drive wheel, the base plate, the baffle and the side wall collaboratively define a mounting chamber enclosing the first drive wheel.

29. The distance measuring device according to claim 27, wherein the side wall encloses an outer periphery of the first drive wheel and the second drive wheel, one end of the side wall is connected to the base plate, the other end of the side wall extends towards the baffle, and the side wall and the base plate define a receiving slot, wherein the first drive wheel and the second drive wheel are both received in the receiving slot;
the distance measuring device, further comprising a mounting plate, wherein the mounting plate is fixed to one end, distal from the base plate, of the second drive wheel, and the mounting plate covers a gap between the second drive wheel and the baffle and a gap between the second drive wheel and the side wall;
the base plate and the side wall collaboratively enclose the second drive wheel, and the mounting plate, the baffle and the base collaboratively define a drive space enclosing the second drive wheel.

30. The distance measuring device according to claim 27, further comprising at least one limiting rib, wherein one end of the limiting rib is fixed to one of the base plate and the baffle, and the other end of the limiting rib is abutted against the other of the base plate and the baffle, such that the limiting rib supports the baffle.

31. A sweeping robot, comprising a distance measuring device, wherein the distance measuring device comprises:
   a base, comprising a base plate and a side wall extending from the base plate;
   a baffle, arranged opposite to the base plate and covering part of the base plate;
   a first drive wheel, rotatably mounted on the base;
   a second drive wheel, rotatably mounted on the base;
   a connecting component, wound on the first drive wheel and the second drive wheel, and configured to drive the second drive wheel to rotate when the first drive wheel rotates; and
   a driving device, connected to the first drive wheel, and configured to drive the first drive wheel to rotate;
   wherein the side wall at least partially encloses an outer periphery of the first drive wheel, the baffle is attached to a part of the side wall enclosing the outer periphery of the first drive wheel, and the base plate, the baffle, and the side wall collaboratively enclose the first drive wheel, the second drive wheel, the base plate, the baffle and the side wall collaboratively define a mounting chamber, wherein the first drive wheel is received in the mounting chamber;
   wherein the baffle is entirely in a plate-shaped structure, a shape of the baffle is adapted to a shape of the part of the side wall enclosing the outer periphery of the first drive wheel;
   along an orientation parallel to the orientation of the first drive wheel towards the second drive wheel, one end of the baffle covers the first drive wheel, and the other end of the baffle extends towards the second drive wheel to an edge of the second drive wheel, shapes of ends, proximal to the second drive wheel, of the baffle are adapted to a shape of the second drive wheel, and a gap exists between the baffle and the second drive wheel.

* * * * *